(12) United States Patent
Kardach et al.

(10) Patent No.: US 8,982,488 B2
(45) Date of Patent: Mar. 17, 2015

(54) POWER CONSERVATION BASED ON HARD DISK ROTATIONAL INERTIA

(71) Applicant: Intel Corporation, Santa Clara, CA (US)

(72) Inventors: James P. Kardach, Saratoga, CA (US); Kirsty MacDonald, Brussels (BE); Peter Gibson, Swindon (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/729,221

(22) Filed: Dec. 28, 2012

(65) Prior Publication Data

US 2014/0185156 A1      Jul. 3, 2014

(51) Int. Cl.
*G11B 19/28* (2006.01)

(52) U.S. Cl.
CPC ..................... *G11B 19/28* (2013.01)
USPC ............................................................ 360/6

(58) Field of Classification Search
None
See application file for complete search history.

(56) References Cited

U.S. PATENT DOCUMENTS

| | | | | |
|---|---|---|---|---|
| 5,682,273 | A * | 10/1997 | Hetzler | 360/75 |
| 6,512,652 | B1 * | 1/2003 | Nelson et al. | 360/78.01 |
| 6,725,385 | B1 * | 4/2004 | Chu et al. | 713/320 |
| 6,839,309 | B1 | 1/2005 | Yunoki et al. | |
| 7,309,967 | B2 * | 12/2007 | Moser et al. | 318/376 |
| 2004/0125727 | A1 | 7/2004 | Schmidt et al. | |
| 2011/0264854 | A1 | 10/2011 | Ouchi et al. | |

FOREIGN PATENT DOCUMENTS

JP      2005293655      10/2005

OTHER PUBLICATIONS

International Search Report and Written Opinion received for PCT Patent Application No. PCT/US2013/047639, mailed Oct. 16, 2013, 13 pages.

\* cited by examiner

*Primary Examiner* — K. Wong
(74) *Attorney, Agent, or Firm* — Kacvinsky Daisak Bluni PLLC

(57) ABSTRACT

Various embodiments are generally directed recurringly cycling the driving of a platter media of a hard drive with a motor, allowing rotation of the platter media to slow only to a threshold rotational speed to balance power conservation with delays in accessing data. A method comprises driving platter media of a hard drive to rotate at a selected normal rotational speed, retrieving data stored on the platter media when the platter media rotates at the normal rotational speed, ceasing to drive the platter media to rotate to allow the platter media to rotate under rotational inertia imparted to the platter media, monitoring a current rotational speed of the platter media, and resuming driving the platter media to rotate based on the current rotational speed falling to a lower threshold rotational speed selected to be less than the normal rotational speed. Other embodiments are described and claimed.

19 Claims, 8 Drawing Sheets

POWER CONSERVATION BASED ON HARD DISK ROTATIONAL INERTIA

BACKGROUND

Portable computing devices are increasingly subject to the two opposing requirements of longer operation times from power sources of limited capacity (e.g., batteries) and greater utility through storage capabilities providing higher capacities and faster access. In response, manufacturers of portable computing devices continue to employ ever newer power and storage technologies, along with continuing improvements thereto, in an effort to provide computing devices that store ever increasing amounts of data in a manner that is ever more quickly accessible while also providing longer operation times.

Efforts to answer these conflicting requirements have resulted in forays into various data storage technologies, including solid state storage technologies such as FLASH. Unfortunately, although such solid state technologies do provide faster storage access while also consuming far less power than ferromagnetic hard drives, concerns remain over the limited lifespans of storage cells within. Thus, hard drives remain a desirable storage technology for use in a wide variety of applications.

With this continuing desirability of hard drives, various efforts have been made to reduce their power consumption, particularly of the motors they employ to rotate the ferromagnetic platter media on which data is magnetically stored. One ongoing approach has been to rely on increasing data storage densities to allow their platter media to be made ever smaller such that less energy is required to rotate their platter media. However, despite considerable strides in such reductions in the physical sizes of hard drives, the fact that they continue to employ media of whatever size or shape that must be rotated by an electric motor has limited the degree of reduction in power consumption that can be achieved in this way.

Another approach has long been turning off the motors of hard disk drives and allowing the platter media to cease to rotate when little or no access to store or retrieve data has occurred within a recent time period and/or is expected to occur. While this entirely eliminates the consumption of electric power by those motors while they remain turned off, this imposes a momentary, but significant increase in power consumption whenever those motors must be turned on again to spin up the platter media back to normal rotational speeds, thereby also imposing a delay in any access to the stored data arising from having to wait until the platters are fully spun up to normal rotational speeds. It is with respect to these and other considerations that the embodiments described herein are needed.

DETAILED DESCRIPTION

Figure 1:
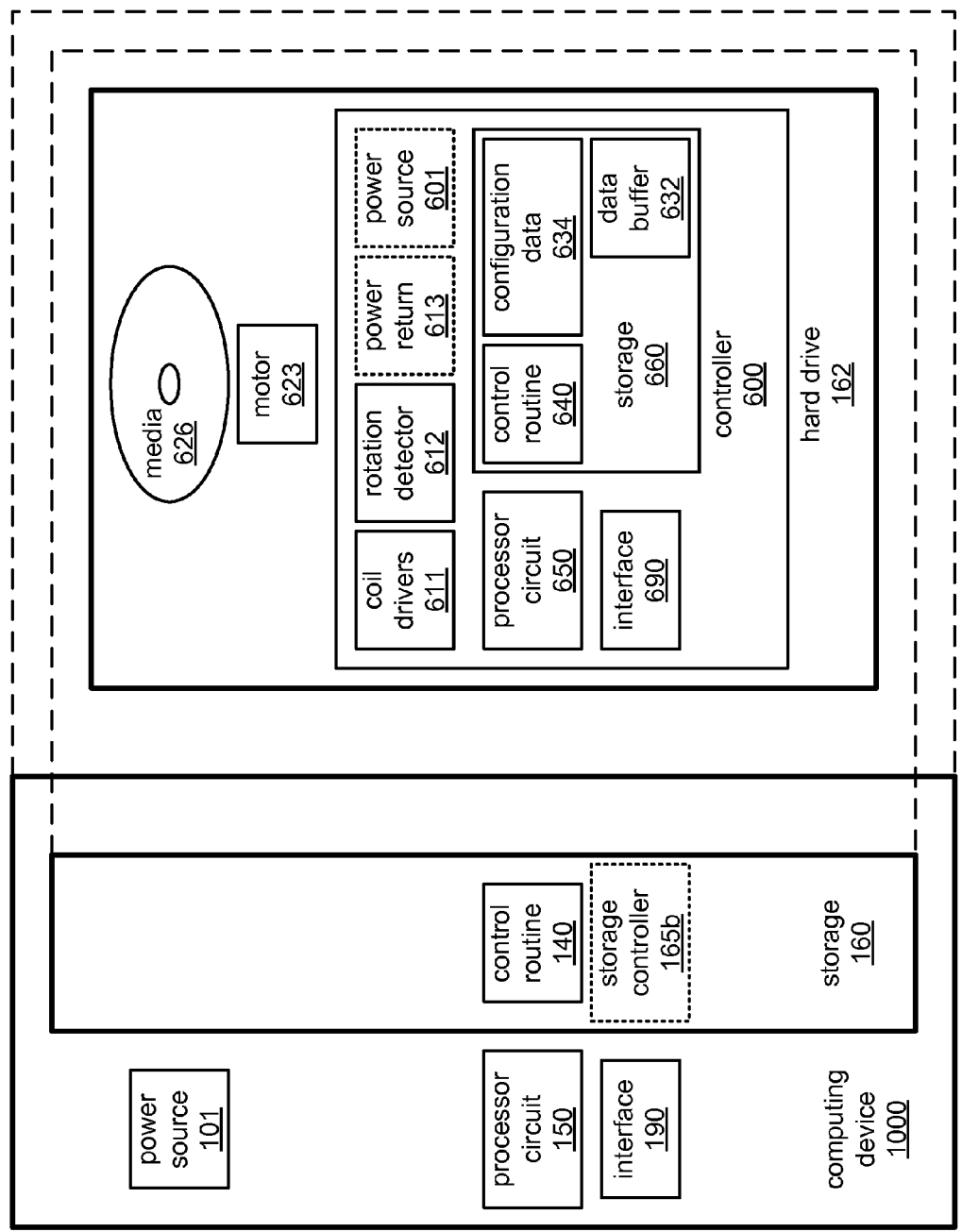
FIG. 1 illustrates an embodiment of a computing device incorporating a hard drive.

Various embodiments are generally directed to a power saving mode of a hard drive that employs recurringly cycling the driving of its platter media with its motor, causing a cycling between allowing rotation of the platter media to slow down to a lower threshold and spinning up the platter media back to an upper threshold rotational speed. More specifically, during this power saving mode, the hard drive motor is powered down to allow the platter media to spin freely with frictional forces inevitably causing the platter media to spin slower and slower until a lower threshold rotational speed is reached. Then, the hard drive motor is powered up again to spin the platter media back up to an upper rotational speed before the hard drive motor is powered down again to again allow the platter media to spin freely again.

In some embodiments, the upper threshold rotational speed is a speed selected between the normal rotational speed for data access purposes and the lower threshold speed. In other embodiments, the upper threshold rotational speed may be the same as the normal rotational speed. In either of such embodiments, the upper and lower rotational speeds are selected to reach towards a desired balance of power conservation and delays in accessing data. The upper and lower threshold rotational speeds are non-zero rotational speeds (non-zero such that the platter media is spinning) that may be chosen to create a cycling of spinning up and spinning freely that tends to balance the consumption of electric power by the motor with the delay incurred from having to wait for the platter media to be spun up to normal rotational speed again when access to store and/or retrieve data is desired.

While being allowed to spin freely (e.g., while not being driven to rotate at the normal rotational speed for access and/or at the upper threshold rotational speed by a motor), the rotational inertia earlier imparted to the platter media is employed in a manner akin to a flywheel to keep the platter media spinning for a period of time. Only the inevitable friction of surrounding air and such necessary mechanical support components as bearings, etc., provides a force that causes the rotational speed to decrease over time such that the lower threshold rotational speed that triggers renewed spinning up is reached.

In various embodiments, a transition from employing motors to drive platter media at normal rotational speeds to allowing the platter media to spin freely may be triggered by a lack of accesses to either store or retrieve data occurring for a selected period of time such that a presumption is made that the hard drive need not be maintained in a fully powered status of readiness for access. Alternatively, such a transition may be preemptively triggered by a processor circuit determining that no data storage or retrieval operations are imminently about to occur. Similarly, in various embodiments, a transition to powering up a motor to drive platter media at normal rotational speeds for access may be triggered by the receipt of signals associated with data storage or retrieval operations. Alternatively, in embodiments in which the upper threshold rotational speed is the normal rotational speed for data access, a transition from freely spinning to spinning up to that upper threshold rotational speed may be awaited such that data storage or retrieval operations are commenced only after a spinning up of the platter media as a result of the lower threshold rotational speed being reached by the platter media spinning down, with such data storage and retrieval operations being buffered and caused to occur opportunistically.

In one embodiment, for example, a method comprises driving platter media of a hard drive to rotate at a selected normal rotational speed, retrieving data stored on the platter media when the platter media rotates at the normal rotational speed, ceasing to drive the platter media to rotate to allow the platter media to rotate under rotational inertia imparted to the platter media, monitoring a current rotational speed of the platter media, and resuming driving the platter media to rotate based on the current rotational speed falling to a lower threshold rotational speed selected to be lower than the normal rotational speed. Other embodiments are described and claimed.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a computing device 1000 externally coupled to and/or internally incorporating a hard drive 162. The computing device 1000 may be any of a variety of types of computing device, including without limitation, a desktop computer system, a data entry terminal, a laptop computer, a netbook computer, an ultrabook computer, a tablet computer, a handheld personal data assistant, a smartphone, a body-worn computing device incorporated into clothing, a computing device integrated into a vehicle (e.g., a car, a bicycle, a wheelchair, etc.), a server, a cluster of servers, a server farm, etc.

The computing device may be coupled to any of a variety of other computing devices via a network (not shown). That network may be a single network possibly limited to extending within a single building or other relatively limited area, a combination of connected networks possibly extending a considerable distance, and/or may include the Internet. Thus, such a network may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the computing device 1000 incorporates one or more of a processor circuit 150 (in the role of a main processor circuit), a storage 160 storing a control routine 140, a power source 101, and an interface 190. In some embodiments, the hard drive 162 is an external device coupled to the computing device 1000, and not incorporated into the computing device 1000, itself. In such embodiments, the hard drive 162 may be coupled to the computing device 1000 via a network to which the computing device 1000 is also coupled via the interface 190, possibly the very same network by which the computing device 1000 may exchange data with one or more other computing devices. In other embodiments, the hard disk drive 162 is incorporated into the computing device 1000, possibly as a component of the storage 160. In such embodiments, the storage 160 may comprise a storage controller 165b by which the hard drive 162 is coupled to at least some other components of the computing device 1000 so as to be accessible by the processor circuit 150.

In various embodiments, the hard drive 162 comprises one or more of a controller 600, a motor 623 and platter media 626. The controller 600 comprises one or more of a processor circuit 650 (in the role of a controller processor circuit), a storage 660, coil drivers 611, a rotation detector 612, and an interface 690. The storage 660 stores one or more of a data buffer 632, a configuration data 634 and a control routine 640. In some embodiments, the controller 600 may also incorporate one or both of a power source 601 and power return 613. The power source 601 may be present in embodiments in which the hard drive 162 is not provided with power from an external source, such as the power source 101 of the computing device 1000.

As will be explained in greater detail, the motor 623 is mechanically coupled to the platter media 626, and the coil drivers 611 are electrically coupled to coils of the motor 623 to cyclically provide electric power to those coils to cause the motor 623 to rotate the platter media 626. The rotation detector 612 is also electrically coupled to the coils of the motor 623 to monitor the rotational speed of the motor 623 (and by extension, the rotational speed of the platter media 626). The platter media 626 may be comprised of any of a variety of materials employing any of a variety of techniques to store data, including any of a variety of magnetic and/or optical techniques. As will also be explained in greater detail, the hard disk 162 is coupled to components of the computing device 1000 (e.g., the interface 190 and/or the storage controller 165b) via the interface 690.

The hard drive 162, with the processor circuit 650 executing at least the control routine 640 in its role as a controller processor circuit defines an operating environment that may be substantially isolated from the main operating environment defined within much of the rest of the computing device 1000 by at least the processor circuit 150 executing the control routine 140 in its role as a main processor circuit. More specifically, the processor circuit 150 may be provided with limited or no access to the storage 660 and/or other components within the hard drive 162, thereby preventing unauthorized access to at least the control routine 640 (either as stored in the storage 660 or as executed by the processor circuit 650) by the processor 150. Alternatively, in other embodiments, a single processor circuit may perform the functions presented herein as separately carried out by each of the processor circuits 150 and 650, such that there is a single operating environment.

It should be noted that although the hard drive 162 is depicted and discussed herein as incorporating a processor circuit executing a control routine to cause the hard drive 162 to perform the various functions described herein, this is but one example of the manner in which the hard drive 162 may be implemented. Other embodiments are possible in which the logical aspects of the hard drive 162 are implemented substantially or entirely in hardware-based digital logic in which no instructions of any form of routine are executed. In such implementations, one or more discrete logic components and/or programmable logic devices may be used. Stated differently, the hard drive 162 comprises logic (in addition to its mechanical components), implemented in any of a variety of ways, that causes the hard drive 162 to perform the various functions described herein.

In executing the control routine 640, the processor circuit 650 is caused to operate the interface 690 to send and receive signals to and from one or more components of the computing device 1000. Those signals convey data to be stored on and/or retrieved from the platter media 626, along with commands and/or status indications associated with such data storage or retrieval operations. The processor circuit 650 is caused to buffer such data within the data buffer 632 maintained within the storage 660 to resolve mismatches in data rates at which data is able to be transferred through the interface 690 and at which data is able to be written to and/or read from the platter media 626.

During normal operation of the hard drive 162 in a fully powered mode, the processor circuit 650 is caused by the control routine 640 to operate the coil drivers 611 to electrically drive coils within the motor 623 to cause the motor 623 to rotate the platter media 626 at a selected normal rotational speed for accessing the platter media 626 for storage and retrieval of data. The processor circuit 650 is caused to access the configuration data 634 stored within a non-volatile portion of the storage 660 to retrieve data specifying this normal rotational speed. As the processor circuit 650 so operates the coil drivers 611, the processor circuit 650 also recurringly accesses the rotational detector 612 to recurringly verify that the platter media 626 is being spun at the normal rotational speed for such access.

However, during a light power saving mode of the hard drive 162, the processor circuit 650 is caused by the control routine 640 to periodically cease operating the coil drivers 611 to electrically drive coils of the motor 623 to cause rotation of the platter media 626 at the normal rotational speed for access. Instead, the processor circuit 650 is caused to operate the coil drivers 611 to cause all driving of those coils to cease so as to allow the platter media 626 to spin freely based on the rotational inertia already imparted to the platter media 626 as a result of having been actively driven at the normal rotational speed by the motor 623.

As the platter media 626 is allowed to spin freely, the processor circuit 650 monitors the rotation detector 612 to recurringly monitor the rotational speed as the platter media 626 spins down (e.g., spins progressively slower over time) as a result of friction between the platter media 626 and surrounding air and as a result of mechanical friction acting on components of the hard drive 162 that physically support the platter media 626 (e.g., bearings, etc.). Eventually, the rotational speed of the platter media 626 falls down to a selected lower threshold rotational speed, triggering the processor circuit 650 to again operate the coil drivers 611 to electrically drive coils of the motor 623 to spin the platter media 626 up to a selected upper threshold rotational speed, before again operating the coil drivers 611 to entirely cease driving those coils to again allow the platter media 626 to spin freely. As with the normal rotational speed for access, the processor circuit 650 is caused to access the configuration data 634 to retrieve the upper and lower threshold rotational speeds.

Although conceivably any non-zero rotational speeds may be selected to be the upper and lower threshold speeds, it is envisioned that these threshold rotational speeds will be selected to achieve a balance between increasing conservation of electric power from setting one or both lower and decreasing the amount of time required to spin the platter media 626 back up to the normal rotational speed to enable access. As has been discussed, the upper threshold rotational speed may be selected to be a rotational speed between the normal rotational speed for data access and the lower threshold rotational speed in some embodiments, or the upper threshold rotational speed may be selected to be the same as the normal rotational speed for data access in other embodiments. At the very least, both of the upper and lower threshold rotational speeds are selected to be non-zero speeds such that there is always some amount of rotational speed affording some degree of rotational momentum to enable spinning the platter media 626 back up to the normal rotational speed in less time than is possible to do so where the platter media 626 has been allowed to stop spinning.

In this way, the processor circuit 650 is caused, during this light power saving mode, to cyclically iterate between spinning up the platter media 626 to the upper threshold rotational speed and allowing the platter media 626 to spin freely until the rotational speed falls to the lower threshold rotational speed. As a result, as long as the hard drive 162 is in this light power saving mode, there is cycling between periods of time at which the motor 623 is powered up to spin up the platter media 626 to the upper threshold rotational speed, and periods of time at which the motor 623 is not driven at all and the platter media 626 is allowed to spin down to the lower threshold rotational speed.

The processor circuit 650 may be caused to monitor the signals received via the interface 690 to await instances in which a selected period of time elapses in which no signals indicative of the processor circuit 150 of the computing device 1000 seeking to store data on or retrieve data from the platter media 626 are received. In response to such a passage of such a period of time, the processor circuit 650 may transition the hard drive 162 from a fully powered mode and into such a light power saving mode in which the motor 623 is cyclically powered up and down at intervals, and the platter media 626 is correspondingly cyclically spun up and allowed to spin freely at those intervals, as has been described.

The processor circuit 650 may be caused to transition the hard drive 162 from this light power saving mode and into a fully powered mode in response to receiving a signal via the interface 690 indicative of the processor circuit 150 of the computing device 1000 seeking to store data on or retrieve data from the platter media 626. Specifically, in response, the processor circuit 650 is caused to operate the coil drivers 611 and monitor the rotation detector 612 to both spin up the platter media 626 to the normal rotational speed for such accesses and maintain the platter media 626 at that rotational speed as the processor circuit 650 carries out such storage and retrieval operations.

The processor circuit 650 may also be caused to transition among at least a fully powered mode and such a light power saving mode by signals received via the interface 690 that convey commands to do so. The processor circuit 650 may be caused to recurringly monitor the interface 690 for instances of receiving such signals.

The processor circuit 650 may be further caused to monitor the signals received via the interface 690 for a command for the hard drive 162 to be powered down into a deep power saving mode or otherwise commanded to cause rotation of the platter media 626 to cease. In embodiments in which the hard drive 162 incorporates the power return 613, the processor circuit 650 may operate the coil drivers 611 to cease to drive coils of the motor 623 in any way, and to then operate the power return 613 to effect regenerative braking to stop rotation of the platter media 626 and to obtain some amount of electric power from doing so. More specifically, where present, the power return 613 is electrically coupled to coils of the motor 623 (in a manner similar to the coil drivers 611 and the rotation detector 612) to use those coils as a regenerative brake by which those coils are caused to generate electricity to recharge one or both of the power sources 101 and 601 (if present) while also causing cessation of rotation of the motor 623 (and accordingly, of the platter media 626).

Still further, the processor circuit 650 may be caused to recurringly operate the interface 690 to transmit signals indicative of what power mode the hard drive 162 is transitioned to and/or whether the platter media 626 is driven to spin at the normal rotational, driven to spin up to an upper threshold rotational speed, or is not being allowed to spin freely. In one possible embodiment, the processor circuit 650 may operate the interface 690 to transmit a signal indicating that a given point in each cycle between spinning up and spinning freely has been reached.

In executing the control routine 140, the processor circuit 150 is caused to access the hard drive 126 to store or retrieve data during normal operation of the computing device 1000. The processor circuit 150 may be caused by the control routine 140 to transition the computing device 1000 among various power modes, including at least one form of power saving mode. Amidst such transitioning, the processor circuit 150 may be further caused to explicitly signal the hard drive 162 to also transition into and/or out of a fully powered mode and/or a power saving mode. Alternatively or additionally, the processor circuit 150 may be caused to monitor the hard drive 162 for signals indicating its current power mode and/or indicating whether the platter media 626 is driven to spin up to a normal rotational speed, is driven to spin up to an upper threshold rotational speed, and/or is not being driven so as to be allowed to spin freely.

In some embodiments, the power sources 101 and 601 (whichever of these is present) may be of a type that stores a limited amount of electric power, e.g., a battery, fuel cell, supercapacitor, etc., as in embodiments in which the computing device 1000 is some form of portable computing device. In embodiments in which one or both of the power sources 101 and 601 comprises a battery, any of a variety of technologies and/or materials may be employed in storing electric power, including without limitation, nickel metal-hydride, lithium-ion, lithium-polymer, etc.

In various embodiments, each of the processor circuits 150 and 650 may comprise any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor circuits may comprise a multi-core processor (whether the multiple cores coexist on the same or separate dies), and/or a multi-processor architecture of some other variety by which multiple physically separate processors are in some way linked.

In various embodiments, each of the storages 160 and 660 may be based on any of a wide variety of information storage technologies, possibly including volatile technologies requiring the uninterrupted provision of electric power, and possibly including technologies entailing the use of machine-readable storage media that may or may not be removable. Thus, each of these storages may comprise any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190 and 690 may employ any of a wide variety of signaling technologies enabling the computing device 1000 to be coupled to other devices as has been described. Each of these interfaces comprises circuitry providing at least some of the requisite functionality to enable such coupling. However, this interface may also be at least partially implemented with sequences of instructions executed by the processor circuits 150 and/or 650 (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2:
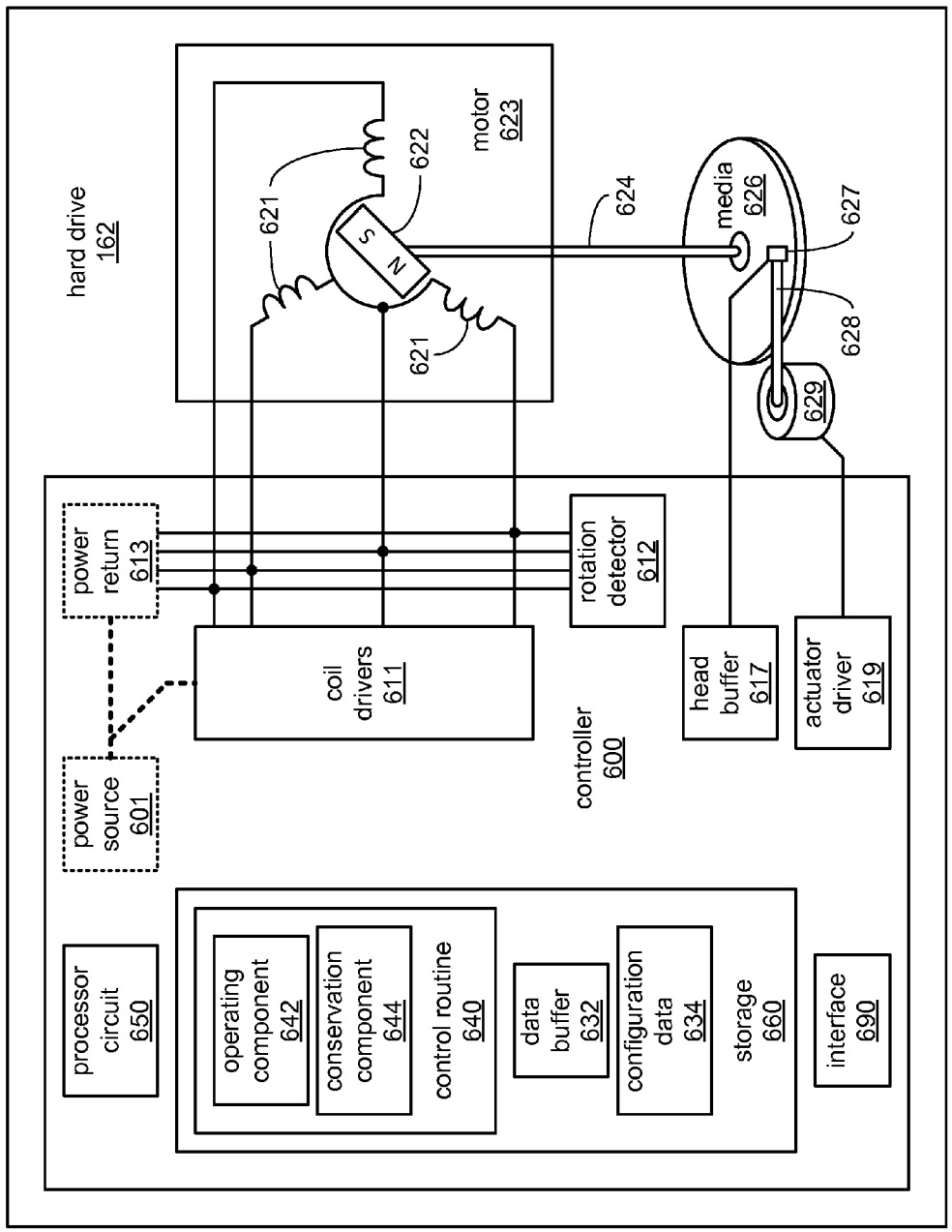
FIG. 2 illustrates a portion of the embodiment of FIG. 1, depicting various possible implementation details.

FIG. 2 illustrates portions of the hard drive 162 of FIG. 1 in greater detail. More specifically, electrical and mechanical aspects are depicted in greater detail, along with aspects of the operating environments of the processor circuit 650 executing the control routine 640 to perform the aforedescribed functions. Specifically, greater detail is provided concerning components of the motor 623 and the manner in which the motor 623 is mechanically coupled to the platter media 626, greater detail is provided concerning the storage of data onto and retrieval of data from the platter media 626, and greater detail is provided concerning components of the control routine 640.

As depicted, the motor 623 comprises a trio of coils 621 arranged in what is commonly referred to as a "Wye" configuration in which one pole of each of the coils 621 is electrically coupled at a common node. As depicted, the motor 623 also comprises at least one permanent magnet 622 positioned to rotate among and to be magnetically driven to rotate by the coils 621. This common node, as well as the other poles of each of the coils 621, are all coupled to each of the coil drivers 611, the rotation detector 612, and the power return 613 (if present). As will be explained in greater detail, each of the coil drivers 611, the rotation detector 612 and the power return 613 are operated in a coordinated manner by the processor circuit 650 to coordinate the timing by which each interacts with one or more of each of the coils 621.

As those skilled in the art of electric motors will readily recognize, the Wye configuration of the coils 621 is but one possible electrical configuration of the coils of an electric motor, and various alternatives (including a "delta" configuration) are also possible. Further, as those skilled in the art of electric motors will also readily recognize, FIG. 2 provides a somewhat simplified schematic depiction of a motor employing the Wye configuration inasmuch as common practice in motor design is to segment each of the coils 621 into a multitude of physically separate windings and/or to employ more than one of the permanent magnet 622 with their poles oriented in a manner corresponding to the segmenting and physical arrangement of the coils 621 to create any of a variety of possible forms of multipolar electric motor.

As depicted, the hard drive 162 further comprises a spindle 624 that the platter media 626 is mechanically to the armature of the motor 623 that comprises at least the depicted one of the permanent magnet 622. As the coils 621 are electrically driven to rotate the at least one permanent magnet 622, the platter media 626 is mechanically drivingly engaged by the permanent magnet 622 through the spindle 624 to rotate to enable storing and retrieval of data.

As depicted, the hard drive 162 further comprises a reading/writing head 627 supported in close proximity to a storage surface of the platter media 626 on an arm 628 coupled to an actuator 629 that moves the arm 628 to move the head 627 relative to that storage surface as the platter media 626 is rotated to provide reading/writing access across much of that storage surface, as those skilled in the art of hard drives will readily recognize. As will also be readily recognized by those skilled in the art of hard drives, FIG. 2 (as well as FIG. 1) provides a somewhat simplified depiction of the platter media 626 and the manner in which data is stored thereon and retrieved therefrom inasmuch as it is common practice for the platter media 626 to include more than one distinct platter and/or to store data on both surfaces of each platter such that more than one distinct arm 628 and distinct head 627 is employed, all of which are typically moved in unison by the single actuator 629.

As depicted, the controller 600 further comprises a head buffer 617 electrically coupled to the head 627 and an actuator driver 619 electrically coupled to the actuator 629. The actuator driver 619 is operable by the processor circuit 650 to move the arm(s) 628 to move the head(s) 627 across the storage surface(s) of the platter media 626 with considerable precision. The head buffer 617 is operable by the processor circuit 650 to drive the head(s) 627 to create magnetic pulses to store data on one or more storage surfaces of the platter media 626, and to subsequently read the minute magnetic fields induced thereon that represent stored data.

As will be recognized by those skilled in the art, the control routine 640, including the components of which it is composed, are selected to be operative on (e.g., executable by) whatever type of processor or processors that are selected to implement the processor circuit 650. In various embodiments, the control routine 640 may comprise a combination of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor circuits 150 and 250, including without limitation, Windows™, OS X™, Linux®, iOS, or Android OS™ Where one or more device drivers are included, those device drivers may provide support for any of a variety of other components, whether hardware or software components, that comprise the hard drive 162.

The control routine 640 may comprise an operating component 642 executable by the processor circuit 650 to carry out the storing of data onto the platter media 626 and the retrieving of data therefrom during a fully powered mode of the hard drive 162. The processor circuit 650 is caused to operate the coil drivers 611 to alternately electrically drive one or more of the coils 621 with differing polarities at different times to generate a recurring succession of magnetic fields to alternately attract and repel the magnetic field(s) generated by the one or more permanent magnets 622 to cause rotation of the armature of the motor 623 of which they are a part to, in turn, cause rotation of the spindle 624, and in turn, cause rotation of the platter media 626 at a specified normal rotational speed.

Regardless of the exact quantity and arrangement of the coils 621 (e.g., regardless of whether there are three of the coils 621 in a Wye configuration, or not), at least at recurring intervals, at least one of the coils 621 is not electrically driven by the coil drivers 611, and is therefore, available for use by the rotation detector 612 to monitor the magnetic field(s) generated by the permanent magnet(s) 622 to determine their current rotational speed and position, and by extension, determine the current rotational speed and position of the platter media 626. The coil drivers 611 include a multitude of field-effect transistors (FETs) and/or other appropriate switching devices arranged to effectively disconnect from at least one pole of one or more of the coils 621 during those recurring intervals so as to place little or no load on those coils 621 such that they are able to be used by the rotation detector 612 to detect those magnetic fields.

This use of one or more of the coils 621 at times when not driven by the coil drivers 611 enables the processor circuit 650 to coordinate movement of the head(s) 627 relative to the storage surface(s) of the platter media 626 to ensure storage of data at intended locations on those storage surface(s) and/or to ensure retrieval of data from intended locations on those storage surface(s). Such use of the coils 621 at times when not driven by the coil driver 611 also enables the processor circuit 650 to recurringly confirm that the rotational speed of the platter media 626 does match the normal rotational speed for access specified in the configuration data 634, which the processor circuit 650 is caused to retrieve therefrom.

The processor circuit 650 is caused to monitor the interface 690 for signals conveying incoming data to be stored and indications of where that data is to be stored on the platter media 626. The processor circuit 650 queues that data in the data buffer 632 (depicted as maintained in the storage 660), and retrieves portions of it to store on the platter media 626 as the head(s) 627 are positioned correctly relative to the storage surface(s) to enable it to be stored.

The processor circuit 650 is also caused to monitor the interface 690 for signals conveying requests for data to be retrieved from the platter media 626 at locations indicated by those signals. In response, the processor circuit 650 retrieves the requested data from those indicated locations as the head(s) 627 are positioned correctly relative to the storage surface(s) to enable such retrieval operations, queues it in the data buffer 632, and operates the interface 690 to transmit the requested data.

The control routine 640 may comprise a conservation component 644 executable by the processor circuit 650 to at least cyclically power down and power up the motor 623 to conserve electric power during one or more forms of power saving mode. The processor circuit 650 is caused to implement a light power saving mode by operating the coil drivers 611 to entirely cease electrically driving any of the coils 621 such that the armature of the motor 623 that comprises at least one of the permanent magnet 622 is no longer actively driven to rotate. This allows the platter media 626 to rotate freely due solely to the rotational inertia imparted to it by being previously driven to rotate by the motor 623. As the platter media 626 continues to rotate, frictional forces of the air surrounding the platters of which the platter media 626 is comprised and mechanical friction of the components that physically support the platter media 626 for rotation progressively slow its rotational speed. Also as the platter media 626 continues to rotate, the processor circuit 650 operates the rotation detector 612 to monitor this decreasing rotational speed, and recurringly compares the current rotational speed to a specified lower threshold rotational speed retrieved by the processor circuit 650 from the configuration data 634.

In response to the rotational speed falling to the extent of meeting and/or falling below the lower threshold rotational speed, the processor circuit 650 once again operates the coil drivers 611 to power up the motor 623 by once again electrically driving the coils 621 to spin up the platter media 626 up to a specified upper threshold rotational speed also retrieved by the processor circuit 650 from the configuration data 634. As the processor circuit 650 so operates the coil drivers 611 to spin up the platter media 626, the processor circuit 650 is also caused to operate the rotation detector 612 to monitor the rotational speed of the platter media 626 to confirm reaching the upper threshold rotational speed. Then, upon again spinning up the platter media 626 to the upper threshold rotational speed, the processor circuit 650 once again operates the coil drivers 611 to power down the motor 623 such that none of the coils 621 are electrically driven so as to again allow the platter media 626 to spin freely under its own rotational inertia. This cyclical operation of the motor 623, repeatedly powering it up and down, continues as long as the hard drive 162 is in this light power saving mode.

Figure 3A:
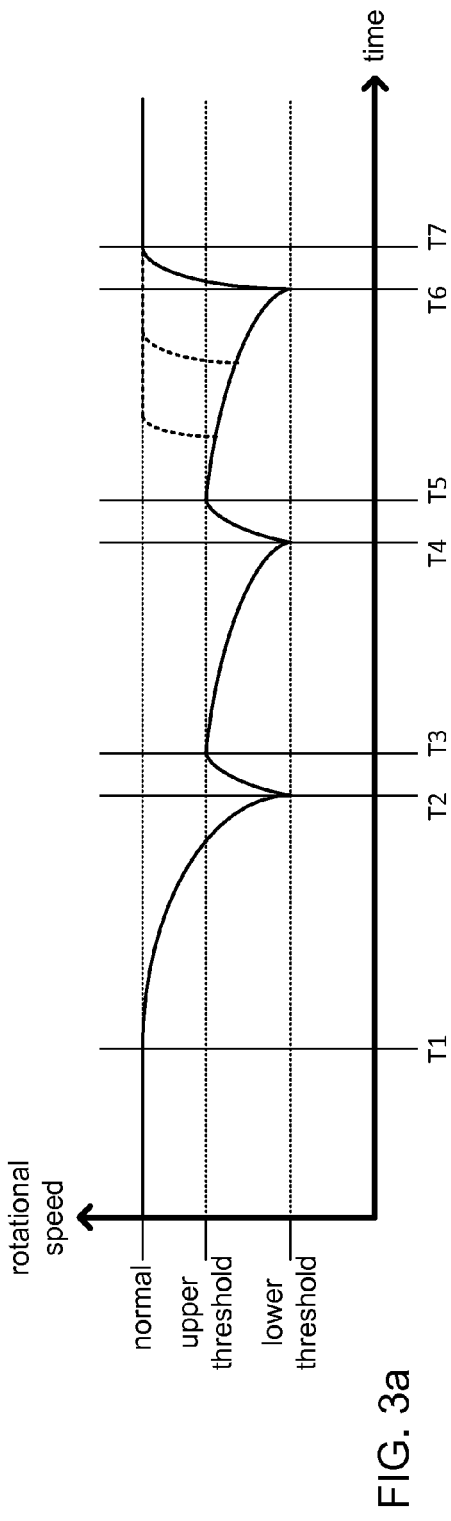
FIGS. 3a and 3b illustrate two variants of operation of the embodiment of FIG. 1 over time.
Figure 3B:
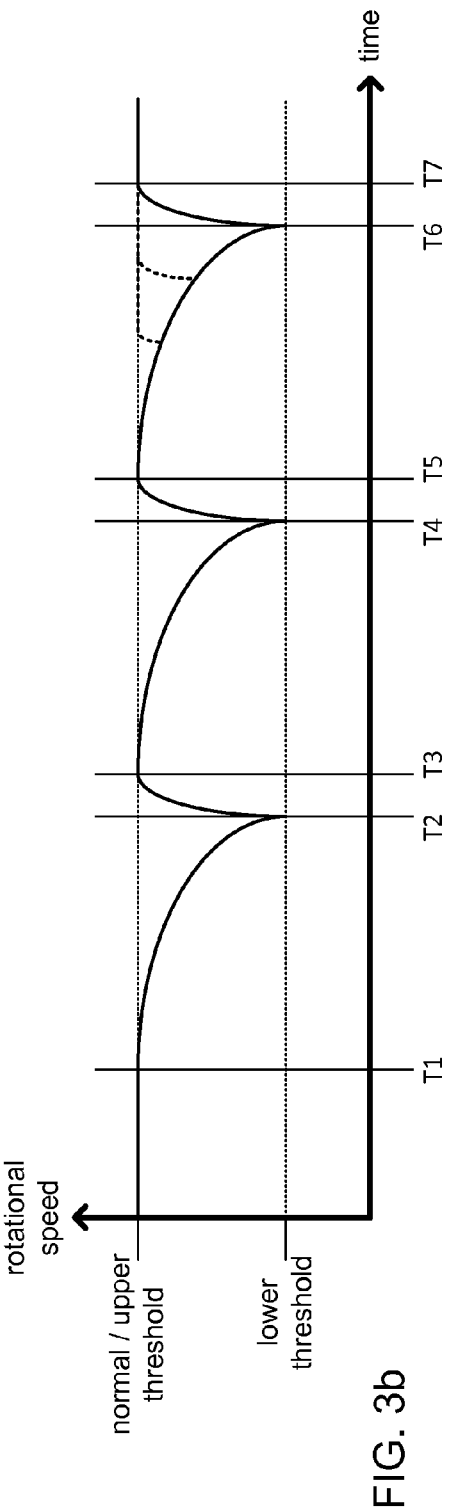

However, as previously discussed, while the upper threshold rotational speed may be selected in some embodiments to be a rotational speed between the lower threshold rotational speed and the normal rotation speed for data access, the upper threshold rotation speed may be selected to be the same speed as the normal rotational speed in other embodiments. Turning briefly to FIGS. 3a and 3b, the cyclical patterns of rotation speed of the platter media 626 over time that results from each of such embodiments implementing a light power saving mode are depicted.

FIG. 3a depicts the resulting cyclical pattern of rotational speed of the platter media 626 during this light power saving mode for embodiments in which the upper threshold rotational speed is selected to be between the lower threshold rotational speed and the normal rotational speed. Leading up to time T1, the hard drive 162 is operated by the processor circuit 650 in a fully powered mode in which the motor 623 remains powered on and continuously drives the platter media 626 at the normal rotational speed. However, starting at time T1, the processor circuit 650 is caused to transition the hard drive 162 to a light power saving mode in which the processor circuit 650 causes the motor 623 to cease to be driven, thereby allowing the platter media 626 to rotate freely, allowing friction to cause a progressive slowing down of its rotational speed from time T1 to time T2. Upon slowing to the point of reaching the lower threshold rotational speed at time T2, the processor circuit 650 causes the motor 623 to be powered up to spin up the platter media 626 to the upper threshold rotational speed from time T2 to time T3. Upon reaching the upper threshold rotational speed at time T3, the processor circuit 650 causes the motor 623 to once again be powered down to again allow the platter media to spin freely under its own rotational inertia until the rotation speed again falls to the lower threshold rotational speed at time T4. At time T4, the powering up of the motor 623 to spin up the platter media 626 takes place, again, until the platter media 626 is once again spinning at the upper threshold rotational speed at time T5, where the motor 623 is again powered down. Free spinning of the platter media 626 is again allowed from time T5 to time T6, where the platter media 626 is again spun up. However, this time, amidst spinning up the platter media 626, the processor circuit 650 has transitioned the hard drive 162 to a fully powered mode such that the motor 623 is powered up to spin up the platter media 626 to the normal rotational speed for data access from time T6 to time T7, and then continues to power the motor 623 to continue to drive the platter media 626 at the normal rotational speed from time T7 onward. It should be noted, however, that the processor circuit 650 may be caused to power up the motor 623 to spin up the platter media 626 to the normal rotational speed of the fully powered mode at times other than when the motor 623 is already powered up to spin up the platter media 626 to the upper threshold rotational speed. Specifically, as depicted in dotted lines between times T5 and T6, the processor circuit 650 may be caused to power up the motor 623 to spin up the platter media 626 to the normal rotational speed at any time while the platter media 626 is allowed to spin freely from time T5 to time T6.

FIG. 3b depicts the resulting cyclical pattern of rotational speed of the platter media 626 during this light power saving mode for embodiments in which the upper threshold rotational speed is selected to be the same rotational speed as the upper threshold rotational speed such that the normal rotational speed serves as the upper threshold rotational speed during the light power saving mode. Leading up to time T1, the hard drive 162 is operated by the processor circuit 650 in a fully powered mode in which the motor 623 remains powered on and continuously drives the platter media 626 at the normal rotational speed. However, starting at time T1, the processor circuit 650 is caused to transition the hard drive 162 to a light power saving mode in which the processor circuit 650 causes the motor 623 to cease to be driven, thereby allowing the platter media 626 to rotate freely, allowing friction to cause a progressive slowing down of its rotational speed from time T1 to time T2. Upon slowing to the point of reaching the lower threshold rotational speed at time T2, the processor circuit 650 causes the motor 623 to be powered up to spin up the platter media 626 back to the normal rotational speed from time T2 to time T3. Upon reaching the normal rotational speed at time T3, the processor circuit 650 causes the motor 623 to once again be powered down to again allow the platter media to spin freely under its own rotational inertia until the rotation speed again falls to the lower threshold rotational speed at time T4. At time T4, the powering up of the motor 623 to spin up the platter media 626 takes place, again, until the platter media 626 is once again spinning at the normal rotational speed at time T5, where the motor 623 is again powered down. Free spinning of the platter media 626 is again allowed from time T5 to time T6, where the platter media 626 is again spun up. However, this time, amidst spinning up the platter media 626 from time T6 to time T7, the processor circuit 650 has transitioned the hard drive 162 to a fully powered mode such that the motor 623 remains powered up to continue to drive the platter media 626 at the normal rotational speed from time T7 onward. It should be noted, however, that the processor circuit 650 may be caused to power up the motor 623 to spin up the platter media 626 to the normal rotational speed of the fully powered mode at times other than when the motor 623 is already powered up to spin up the platter media 626 to the normal threshold rotational speed as a result of the rotational speed having fallen to the lower threshold rotational speed. Specifically, as depicted in dotted lines between times T5 and T6, the processor circuit 650 may be caused to power up the motor 623 to spin up the platter media 626 to the normal rotational speed at any time while the platter media 626 is allowed to spin freely from time T5 to time T6.

Returning to FIG. 2, while the hard drive 162 is in such a light power saving mode, the processor circuit 650 may be further caused by the conservation component 644 to recurringly operate the interface 690 to transmit a signal each time a particular point in the cyclic powering up and powering down of the motor 623 and accompanying free spinning and spinning up of the platter media 626 occurs. By way of example, a signal may be transmitted via the interface 690 each time the motor 623 is powered up to spin up the platter media 626 from the lower threshold rotational speed and back to the upper threshold rotational speed. Where the upper threshold rotational speed is selected to be the same as the normal rotational speed, the indication of the motor 623 being powered up to spin up the platter media back to the upper threshold rotational speed (e.g., the normal rotational speed) transmitted to the computing device 1000 that the rotational speed normally used in data storage and/or retrieval operations will soon be reached, thereby enabling opportunistic use of the cyclic timing to control when such data operations are performed. This may enable tighter coordination between the processor circuits 150 and 650 in timing data storage and retrieval operations with such cycles in the light power saving mode in an effort to enhance conservation of electric power.

In embodiments incorporating the power return 613, the processor circuit 650 may be caused to implement a deep power saving mode by operating the coil drivers 611 to entirely cease electrically driving any of the coils 621, and to then operate the power return 613 to employ regenerative braking of the platter media 626 by operating the motor 623 as a generator to return electric power to the power source 601 (if present) and/or to a power source external to the hard drive 162 (e.g., the power source 101). The power return 613 comprises switching components (possibly some form of FET) that are caused to couple the nodes of the coils 621 to a power source through other components of the power return 613 to provide electric power back to that power source. In so doing, as those skilled in the art of regenerative braking will readily recognize, opposing magnetic fields are created between the coils 621 and the permanent magnet(s) 622 that resist continued rotation until rotation is stopped.

Figure 5:
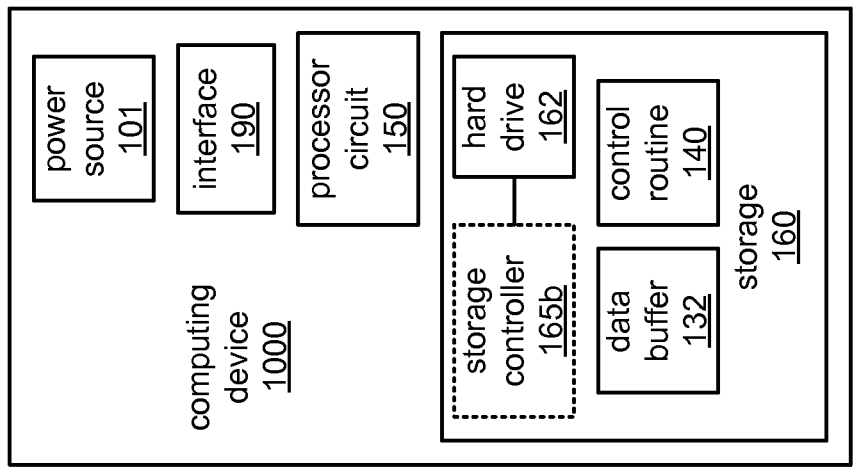
FIG. 5 illustrates a portion of the embodiment of FIG. 1, depicting various possible implementation details.
Figure 4:
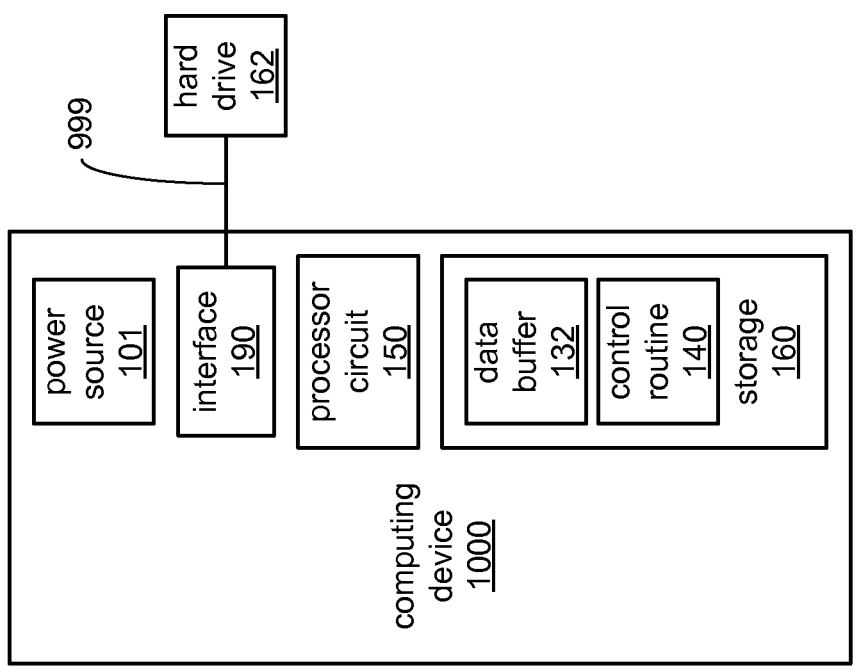
FIG. 4 illustrates a portion of the embodiment of FIG. 1, depicting various possible implementation details.

FIGS. 4 and 5 illustrate portions of the computing device 1000 of FIG. 1 in greater detail. More specifically, each of these figures depicts aspects of different possibilities in coupling the hard drive 162 to the computing device 1000.

As depicted in FIG. 4, the hard drive 162 may be coupled externally to the computing device 1000 via network 999 to which the computing device 1000 is coupled by the interface 190. It may be that the interface 690 and/or other aspects of the controller 600 are configured to enable the hard drive 162 to function as a network-attached storage (NAS) device. In some embodiments, the computing device 1000 may coordinate power saving modes to a limited degree with the controller 600 of the hard drive 162, possibly transmitting commands to the hard drive 162 to transition among a fully powered mode, a light power saving mode in which the platter media 626 of the hard drive 162 is cyclically spun up and allowed to spin freely as has been described in detail, and a deep power saving mode in which rotation of the platter media 626 is stopped via regenerative braking (possibly recharging a local power source, such as the power source 601). Alternatively or additionally, the processor circuit 650 of the controller 600 may transition the hard drive 162 among such power modes in response to the receipt and/or lack of receipt of requests to store and/or retrieve data, as has been discussed.

As depicted in FIG. 5, the hard drive 162 may be fully incorporated into the computing device 1000 as part of the storage 160 such that it is electrically coupled to other components of the computing device 1000 via the storage controller 165b. In embodiments in which the upper threshold rotational speed is the same as the normal rotation speed for access, the computing device 1000 may coordinate the timing of data storage and retrieval operations with cyclical spinning up and free spinning of the platter media 626 of a light power saving mode in an effort to better optimize power conservation by the hard drive 126. By way of example, the processor circuit 150 may be caused by its execution of the control routine 140 to queue data storage and/or retrieval operations to be performed in a data buffer 132 maintained within the storage 160, and await an instances of a recurring signal from the hard drive 162 that is sent by the hard drive 162 coincident with the cyclic spinning up of the platter media 626 from the lower threshold rotational speed to the normal rotational speed, as has been described.

Figure 6:
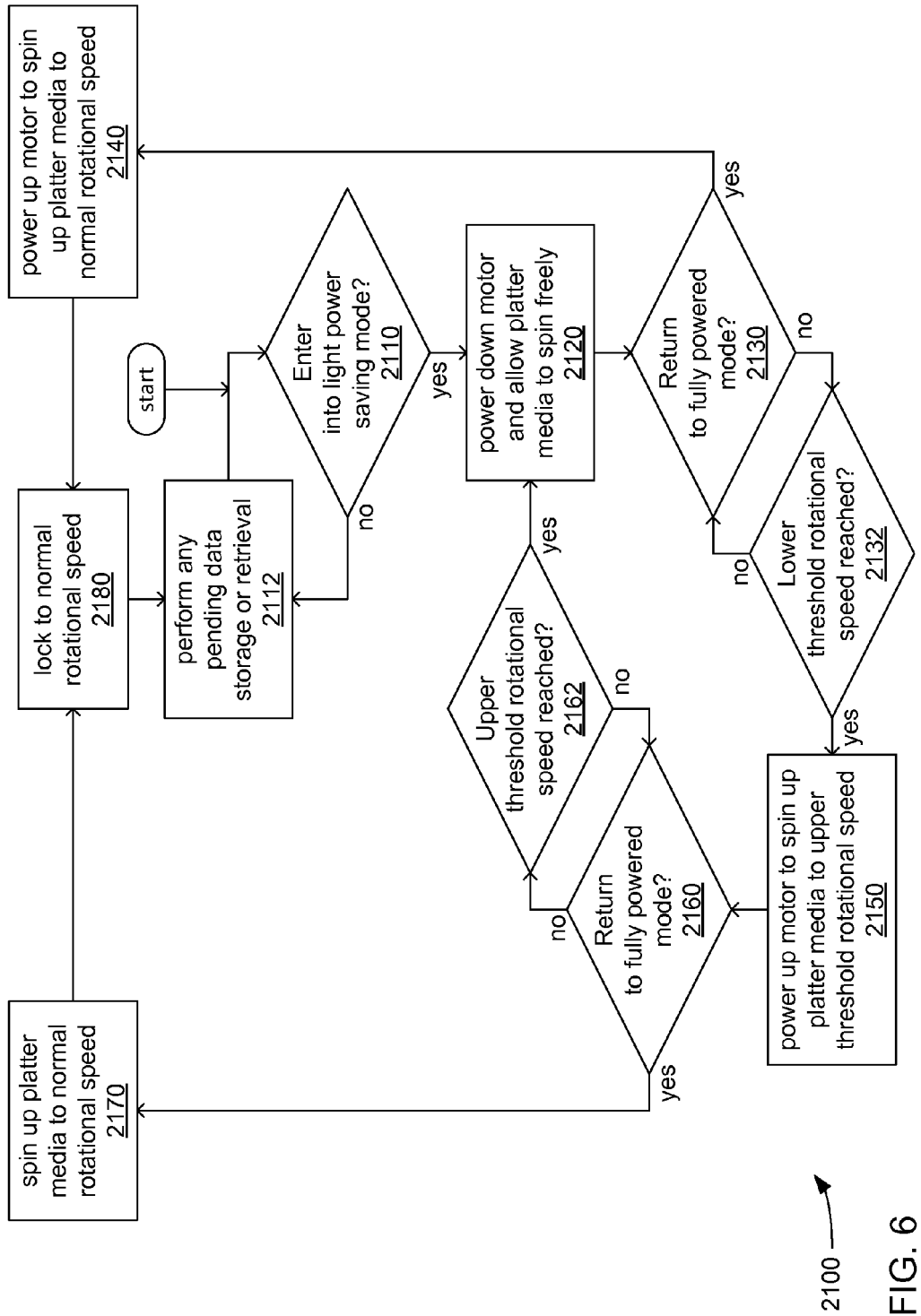
FIG. 6 illustrates an embodiment of a first logic flow.

FIG. 6 illustrates an embodiment of a logic flow 2100. The logic flow 2100 may be representative of some or all of the operations executed by one or more embodiments described herein. More specifically, the logic flow 2100 may illustrate operations performed by at least the processor circuit 650 of the controller 600 of the hard drive 162 in executing at least the control routine 640.

At 2110, a controller processor circuit of a controller of a hard drive (e.g., the processor circuit 650 of the controller 600 of the hard drive 162) makes a check as to whether or not the hard drive is to be placed in a light power saving mode. If not, then the controller leaves the hard drive in a fully powered mode, and continues to carry out any pending data storage or retrieval operations at 2112. However, if so, then the controller places the hard drive in the light power saving state, powering down of the motor that spins the platter media to allow the platter media to spin freely at 2120. As has been discussed, the hard drive may be caused to enter a light power conservation mode for various reasons, including and not limited to receiving an explicit command to do so or as a result of a selected period of time having elapsed since the last data storage or retrieval operation was requested of the hard drive.

At 2130, as the platter media is spinning freely such that it is gradually spinning down as a result of frictional forces acting thereon, a check is made as to whether the hard drive is to be returned to the fully powered mode. If so, then the controller places the hard drive in fully powered mode, powering up the motor to spin up the platter media back to the normal rotational speed for data storage and retrieval operations at 2140. Then, at 2180, the controller acts to lock the rotational speed of the platter media to the normal rotational speed, using its rotation detector to ensure that the normal rotational speed is maintained with sufficient precision to enable data storage and retrieval operations to be performed again at 2112.

However, if the hard drive is not to be returned to the fully powered mode at 2130, then a check is made at 2132 as to whether the platter media has yet spun down such that its rotational speed has fallen down to the lower threshold rotational speed. If not, then the check at 2130 is repeated. However, if the rotational speed of the platter media has fallen to the lower threshold rotational speed, then the controller powers up the motor at 2150 to spin the platter media up to an upper threshold rotational speed. As has been previously discussed, in differing embodiments, the upper threshold rotational speed may be selected to be higher than the lower threshold rotational speed, but lower than the normal rotational speed for data storage and retrieval operations. Alternatively, in other embodiments, the upper threshold rotational speed may be selected to be the same speed as the normal rotational speed for such data access.

At 2160, as the platter media is being driven to spin up to the upper threshold rotational speed, a check is made as to whether the hard drive is to be returned to the fully powered mode. If so, then the controller places the hard drive in fully powered mode, driving the motor to spin up the platter media back to the normal rotational speed for data storage and retrieval operations at 2170. Then, at 2180, the controller acts to lock the rotational speed of the platter media to the normal rotational speed, using its rotation detector to ensure that the normal rotational speed is maintained with sufficient precision to enable data storage and retrieval operations to be performed again at 2112.

However, if the hard drive is not to be returned to the fully powered mode at 2160, then a check is made at 2162 as to whether the platter media has yet spun up such that its rotational speed has reached the upper threshold rotational speed. If not, then the check at 2160 is repeated. However, if the rotational speed of the platter media has reached the upper threshold rotational speed, then the controller again powers down the motor at 2120 to allow the platter media to spin freely.

Figure 7:
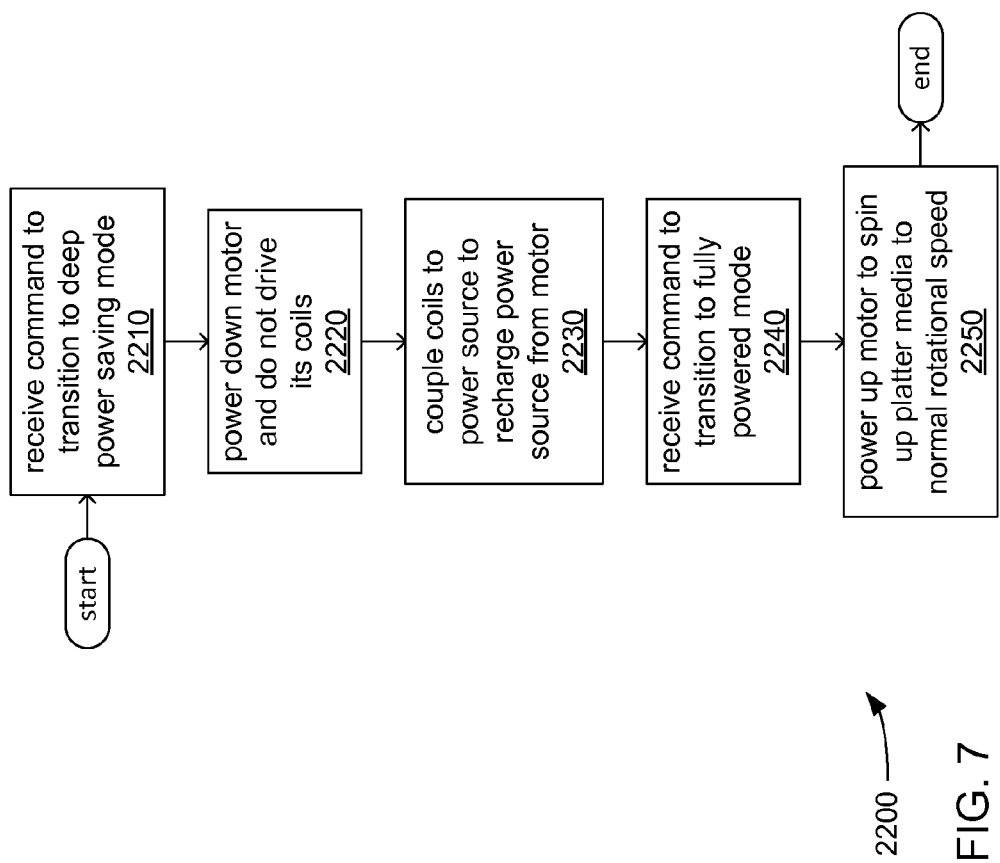
FIG. 7 illustrates an embodiment of a second logic flow.

FIG. 7 illustrates an embodiment of a logic flow 2200. The logic flow 2200 may be representative of some or all of the operations executed by one or more embodiments described herein. More specifically, the logic flow 2200 may illustrate operations performed by at least the processor circuit 650 of the controller 600 of the hard drive 162 in executing at least the control routine 640.

At 2210, a controller processor circuit of a controller of a hard drive (e.g., the processor circuit 650 of the controller 600 of the hard drive 162) is caused to receive a command from a main processor circuit of a computing device (e.g., the processor circuit 150 of the computing device 1000) to transition the hard drive to a deep power saving mode via an interface of the controller (e.g., the interface 690).

At 2220, the controller processor circuit causes the powering down of the motor of the hard drive (e.g., the motor 623) in a manner that includes electrically disconnecting any coil drivers (e.g., the coil drivers 611) from the coils of the motor (e.g., the coils 621). Then, at 2230, the controller processor circuit causes the coupling of the coils of the motor to a power source (e.g., one or both of the power sources 101 and 601) to apply regenerative braking to stop any continued rotation of the platter media in a manner that recharges the power source.

At 2240, the controller processor circuit is caused to receive a command from the main processor circuit of a computing device to transition the hard drive to a fully powered mode via the interface. Then, at 2250, the controller processor circuit causes the powering up of the motor by once again electrically connecting the coil drivers to the coils of the motor, electrically driving them to cause spinning up of the motor, and correspondingly, of the platter media.

Figure 8:
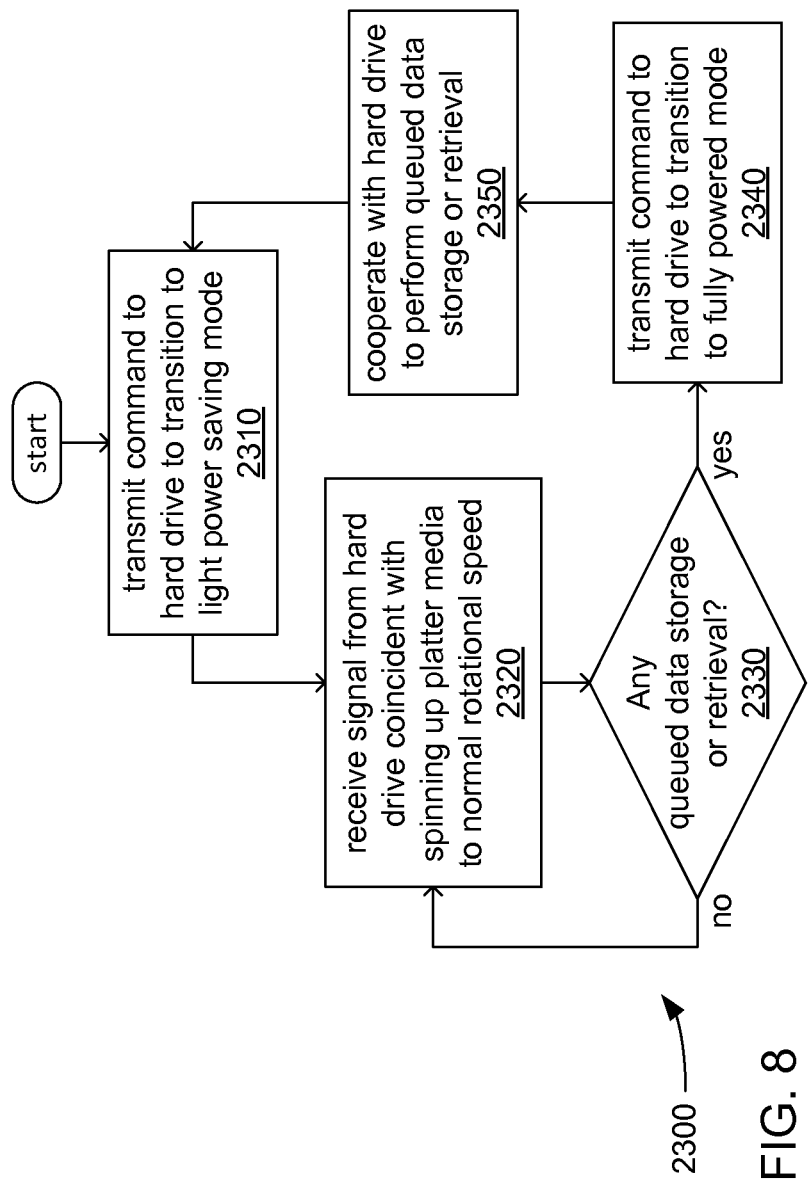
FIG. 8 illustrates an embodiment of a third logic flow.

FIG. 8 illustrates an embodiment of a logic flow 2300. The logic flow 2300 may be representative of some or all of the operations executed by one or more embodiments described herein. More specifically, the logic flow 2300 may illustrate operations performed by at least the processor circuit 150 of the computing device 1000 in executing at least the control routine 140.

At 2310, a main processor circuit of a computing device (e.g., the processor circuit 150 of the computing device 1000) is caused to transmit a command to a hard drive (e.g., the hard drive 162) to transition to a light power saving mode in an embodiment in which the light power saving mode entails cycling between allowing the platter media to spin freely down to a lower threshold rotational speed and spinning up the platter media to an upper threshold rotational speed that is selected to be the same as the normal rotational speed at which data storage and retrieval access normally occurs. As previously discussed, depending on whether the hard drive is incorporated into the computing device or is externally coupled to the computing device and/or other factors, such a command may be transmitted to the hard drive via a network (e.g., the network 999).

At 2320, the main processor circuit recurringly receives a signal from the hard drive coinciding with the spinning up of the platter media back to that upper threshold rotational speed that is also the normal rotational speed. At 2330, following the receipt of each such signal, a check is made as to whether there are any storage or retrieval operations that have been queued by the main processor circuit. If not, then another such signal is awaited and received at 2320, prompting another such check at 2330.

However, if at 2330, storage and/or retrieval operations have been queued, then the main processor circuit is caused to transmit a command to the hard drive at 2340 to transition to a fully powered mode to prevent the hard drive from continuing to remain in the light power saving mode such that its motor is again powered down to allow the platter media to again spin freely. Stated differently, by transmitting the command to the hard drive to transition to a fully powered mode, its motor remains powered up and the platter media remains driven to the normal rotational speed, thereby enabling storage and/or retrieval operations to be performed.

At 2350, the main processor circuit cooperates with the hard drive to perform the queued storage and/or retrieval operations, at least by transmitting indications of those operations to the hard drive to enable the hard drive to perform them.

Figure 9:
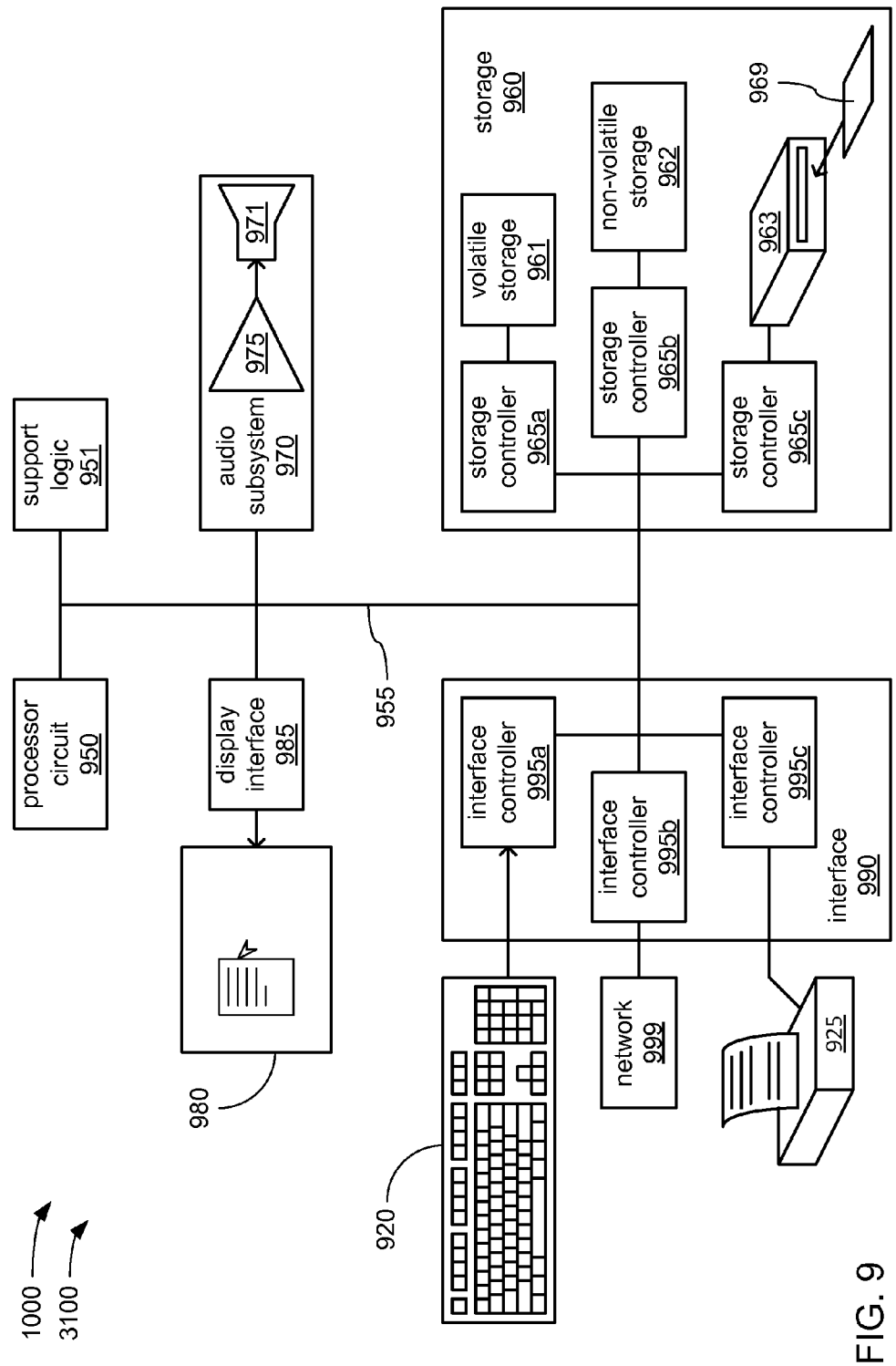
FIG. 9 illustrates an embodiment of a processing architecture.

FIG. 9 illustrates an embodiment of an exemplary processing architecture 3100 suitable for implementing various embodiments as previously described. More specifically, the processing architecture 3100 (or variants thereof) may be implemented as part of the computing device 1000, and/or within the controller 200. It should be noted that components of the processing architecture 3100 are given reference numbers in which the last two digits correspond to the last two digits of reference numbers of components earlier depicted and described as part of each of the computing device 1000 and the controller 200. This is done as an aid to correlating such components of whichever ones of the computing device 1000 and the controller 200 may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3100, a computing device comprises at least a processor circuit 950, support logic 951, a storage 960, a controller 900, an interface 990 to other devices, and coupling 955. As will be explained, depending on various aspects of a computing device implementing the processing architecture 3100, including its intended use and/or conditions of use, such a computing device may further comprise additional components, such as without limitation, an audio subsystem 970 comprising an audio amplifier 975 and an acoustic driver 971, and a display interface 985.

The controller 900 corresponds to the controller 200. As previously discussed, the controller 200 may implement the processing architecture 3100. Thus, in essence, the controller 200 could be regarded, at least to some extent, as a computing device embedded within the computing device 1000. As such, the controller 200 may perform various functions, including those that have been described at length herein, in support of the computing device 1000 performing various functions.

Coupling 955 is comprised of one or more buses, point-to-point interconnects, transceivers, buffers, crosspoint switches, and/or other conductors and/or logic that communicatively couples at least the processor circuit 950 to the storage 960. Coupling 955 may further couple the processor circuit 950 to one or more of the interface 990, the audio subsystem 970 and the display interface 985 (depending on which of these and/or other components are also present). With the processor circuit 950 being so coupled by couplings 955, the processor circuit 950 is able to perform the various ones of the tasks described at length, above, for whichever ones of the computing device 1000 and the controller 200 implement the processing architecture 3100. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to one or more of the processor circuits 150 and 250) may comprise any of a wide variety of commercially available processors, employing any of a wide variety of technologies and implemented with one or more cores physically combined in any of a number of ways.

As previously discussed, the storage 960 (corresponding to one or more of the storages 160 and 260) may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and comprises one or more optical and/or solid-state disk drives employing one or more pieces of machine-readable storage medium 969 (possibly corresponding to the storage medium 169), the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may comprise an article of manufacture in the form of a machine-readable storage media on which a routine comprising a sequence of instructions executable by the processor circuit 950 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor circuit 950 as that routine is executed.

As previously discussed, the interface 990 (possibly corresponding to the interface 190) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually comprises) a display (e.g., the depicted example display 980, corresponding to the display 180), such a computing device implementing the processing architecture 3100 may also comprise the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing device 1000 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of a controller includes coil drivers of a controller to drive coils of an electric motor to rotate a permanent magnet of the motor, the permanent magnet mechanically coupled to platter media to drive the platter media to rotate; and logic to cause the controller to electrically drive the coils to cause the platter media to rotate at a selected normal rotational speed, cease to electrically drive the coils to allow the platter media to freely rotate under rotational inertia, monitor signals received from the coils to monitor a current rotational speed of the platter media as the platter media freely rotates, and resume electrically driving the coils to rotate the platter media in response to the rotational speed of the platter media falling to a lower threshold rotational speed selected to be a non-zero speed and less than the normal rotational speed.

The above example of a controller in which the controller includes a rotational detector to detect the current rotational speed of the permanent magnet to enable determination of the rotational speed of the platter media, and the logic is to store data on or retrieve data from the platter media when the platter media rotates at the normal rotational speed.

Either of the above examples of a controller in which the logic includes a controller processor circuit and storage to store instructions executed by the controller processor circuit, and the controller processor circuit is caused to retrieve the normal rotational speed and the lower threshold rotational speed from the storage.

Any of the above examples of a controller in which the controller is caused to recurringly cease to drive the coils based on the platter media rotating at an upper threshold rotational speed, and recurringly resume driving the coils to rotate the platter media up to the upper threshold rotational speed based on the platter media rotating at the lower threshold rotational speed.

Any of the above examples of a controller in which the controller includes an interface to couple the logic to a computing device, and the controller is caused to receive a signal via the interface conveying a first command to transition to a power saving mode, cease to drive the coils to allow the platter media to rotate under rotational inertia of at least the platter media based on the first command, receive a signal via the interface conveying a second command to transition to a fully powered mode, and resume driving the coils to rotate the platter media at the normal rotational speed based on the second command.

Any of the above examples of a controller in which the controller includes an interface to couple the logic to a computing device, and the controller is caused to await a selected period of time since receiving any signal conveying a command to either store or retrieve data, cease to drive the coils to allow the platter media to rotate under rotational inertia of at least the platter media based on the selected period of time elapsing, receive a signal via the interface conveying a command to either store or retrieve data when ceasing to drive the coils, and resume driving the coils to rotate the platter media at the normal rotational speed based on the command.

Any of the above examples of a controller in which the controller includes an interface to couple the logic to a computing device, and the controller is caused to receive a signal via the interface conveying a command to transition to a power saving mode, cease to drive the coils, and coupling the coils to a power source to regeneratively brake rotation of the platter media and recharge the power source.

An example of a computer-implemented method includes driving platter media of a hard drive to rotate at a normal rotational speed, retrieving data stored on the platter media when the platter media rotates at the normal rotational speed, ceasing to drive the platter media to rotate to allow the platter media to rotate under rotational inertia imparted to the platter media, monitoring a current rotational speed of the platter media, and resuming driving the platter media based on the current rotational speed falling to a threshold rotational speed selected to be a non-zero rotational speed and less than the normal rotational speed.

The above example of a computer-implemented method in which the method includes storing data on the platter media when the platter media rotates at the normal rotational speed.

Either of the above examples of a computer-implemented method in which driving the platter media to rotate at the normal rotational speed comprises powering up a motor mechanically coupled to the platter media to drive the platter media to rotate at the normal rotational speed.

Any of the above examples of a computer-implemented method in which ceasing to drive the platter media to rotate at the normal rotational speed comprises powering down the motor.

Any of the above examples of a computer-implemented method in which the method includes recurringly ceasing to drive the platter media to rotate based on the platter media rotating at the normal rotational speed, and recurringly resuming driving the platter media to rotate at the normal rotational speed and transmitting a signal coincident with resuming driving the platter media based on the platter media rotating at the threshold rotational speed.

Any of the above examples of a computer-implemented method in which the method includes receiving a signal conveying a first command to transition to a power saving mode, ceasing to drive the platter media to rotate at the normal rotational speed to allow the platter media to rotate under rotational inertia based on the first command, receiving a signal conveying a second command to transition to a fully powered mode, and resuming driving the platter media to rotate at the normal rotational speed based on the second command.

Any of the above examples of a computer-implemented method in which the method includes awaiting a selected period of time since receiving any signal conveying a command to either store or retrieve data, ceasing to drive the platter media to rotate at the normal rotational speed to allow the platter media to rotate under rotational inertia based on the selected period of time elapsing, receiving a signal conveying a command to either store or retrieve data when ceasing to rotate the platter, and resuming driving the platter media to rotate at the normal rotational speed based on the command.

Any of the above examples of a computer-implemented method in which the method includes receiving a signal conveying a command to transition to a power saving mode, ceasing to drive the platter media to rotate at the normal rotational speed, and coupling coils of a motor mechanically coupled to the platter media to a power source to regeneratively brake rotation of the platter media and recharge the power source.

An example of an apparatus includes platter media to store data; a motor mechanically coupled to the platter media to rotate the platter media; and a controller comprising logic to cause the controller to await a selected period of time since receiving any signal conveying a command to either store or retrieve data, power down the motor to cease to drive the platter media to rotate based on the period of time elapsing and the platter media rotating at a selected normal rotational speed, recurringly power down the motor to cease to drive the platter media to rotate based on the period of time elapsing and the platter media rotating at an upper threshold rotational speed selected to be less than the normal rotational speed, recurringly power up the motor to drive the platter media to rotate at the upper threshold rotational speed based on the period of time elapsing and the platter media rotating at a lower threshold rotational speed selected to be less than the upper threshold rotational speed, and power up the motor to drive the platter media to rotate at the normal rotational speed based on receiving a signal conveying a command to either store or retrieve data.

The above example of an apparatus in which the controller is caused to either store data on the platter media or retrieve data from the platter media when the platter media rotates at the normal rotational speed.

Either of the above examples of an apparatus in which the controller is caused to receive a signal conveying a first command to transition to a power saving mode, power down the motor to cease to drive the platter media to rotate at the normal rotational speed and allow the platter media to rotate under rotational inertia based on the first command, receive a signal conveying a second command to transition to a fully powered mode, and power up the motor to resume driving the platter media to rotate at the normal rotational speed based on the second command.

Any of the above examples of an apparatus in which the controller is caused to receive a signal conveying a command to transition to a power saving mode, power down the motor to cease to drive the platter media to rotate at the normal rotational speed, and electrically couple coils of the motor to a power source to regeneratively brake rotation of the platter media and recharge the power source.

An example of another apparatus includes a main processor circuit; and a storage communicatively coupled to the main processor circuit to store instructions that when executed by the main processor circuit cause the main processor circuit to signal a hard drive communicatively coupled to the main processor circuit to transition to a light power saving mode, queue a data retrieval operation in a buffer, receive a signal from the hard drive indicative of platter media of the hard drive driven to rotate at a selected normal rotational speed, and signal the hard drive to perform the data retrieval operation.

The above example of another apparatus in which the main processor circuit is caused to signal the hard drive to transition to a fully powered mode.

Either of the above examples of another apparatus in which the apparatus includes a power source, and the main processor circuit is caused to signal the hard drive to transition to a deep power saving mode to cause regenerative braking of the platter media and recharge the power source.

The invention claimed is:

1. A controller comprising:
   coil drivers of a controller to drive coils of an electric motor to rotate a permanent magnet of the motor, the permanent magnet mechanically coupled to platter media to drive the platter media to rotate; and
   logic to cause the controller to:
      electrically drive the coils to cause the platter media to rotate at a selected normal rotational speed;
      determine whether to place the platter media in a low power state;
      cease to electrically drive the coils to allow the platter media to freely rotate under rotational inertia based on the determination to place the platter media in the low power state;
      monitor signals received from the coils to monitor a current rotational speed of the platter media during the low power state;
      recurringly resume electrically driving the coils to rotate the platter media in response to the rotational speed of the platter media falling to a lower threshold rotational speed, the lower threshold rotational speed a non-zero speed and less than the normal rotational speed; and recurringly cease to drive the coils based on the platter media rotating at an upper threshold rotational speed, the upper threshold rotational speed greater than the lower threshold rotational speed and less that the normal rotational speed.

2. The controller of claim 1, comprising a rotational detector to detect the current rotational speed of the permanent magnet to enable determination of the rotational speed of the platter media, the logic to store data on or retrieve data from the platter media when the platter media rotates at the normal rotational speed.

3. The controller of claim 1, the logic comprising a controller processor circuit and non-transitory storage to store instructions executed by the controller processor circuit, the controller processor circuit caused to retrieve the normal rotational speed and the lower threshold rotational speed from the non-transitory storage.

4. The controller of claim 1, the controller caused to:
determine whether to exit the low power state; and
resume electrically driving the coils to rotate the platter media up to the normal rotational speed based on the determination to exit the low power state.

5. The controller of claim 4, comprising an interface to couple the logic to a computing device, the controller caused to:
receive a signal via the interface conveying a first command to transition to a power saving mode;
determine whether to place to the platter media in a low power state based on receiving the first command;
receive a signal via the interface conveying a second command to transition to a fully powered mode; and
determine whether to exit the low power state based on receiving the second command.

6. The controller of claim 4, comprising an interface to couple the logic to a computing device, the controller caused to:
await a selected period of time since receiving any signal conveying a command to either store or retrieve data;
determine whether to place the platter media in a low power state based on the selected period of time elapsing without receiving the command to either store or retrieve data;
receive a signal via the interface conveying a command to either store or retrieve data when ceasing to drive the coils;
determine whether to exit the low power state based on receiving the command to either store or retrieve data; and
resume driving the coils to rotate the platter media at the normal rotational speed based on the command.

7. The controller of claim 1, comprising an interface to couple the logic to a computing device, the controller caused to:
coupling the coils to a power source to regeneratively brake rotation of the platter media and recharge the power source.

8. A computer-implemented method comprising:
driving platter media of a hard drive to rotate at a normal rotational speed;
retrieving data stored on the platter media when the platter media rotates at the normal rotational speed;
determining whether to place the platter media in a low power state;
ceasing to drive the platter media to rotate to allow the platter media to rotate under rotational inertia imparted to the platter media based on the determination to place the platter media in the low power state;
monitoring a current rotational speed of the platter media;
resuming driving the platter media based on the current rotational speed falling to a lower threshold rotational speed, the lower threshold rotational speed a non-zero rotational speed and less than the normal rotational speed; and
ceasing to drive the coils based on the platter media rotating at an upper threshold rotational speed, the upper threshold rotational speed greater than the lower threshold rotational speed and less that the normal rotational speed.

9. The computer-implemented method of claim 8, comprising storing data on the platter media when the platter media rotates at the normal rotational speed.

10. The computer-implemented method of claim 8, driving the platter media to rotate at the normal rotational speed comprises powering up a motor mechanically coupled to the platter media to drive the platter media to rotate at the normal rotational speed.

11. The computer-implemented method of claim 10, ceasing to drive the platter media to rotate at the normal rotational speed comprises powering down the motor.

12. The computer-implemented method of claim 8, comprising:
recurringly ceasing to drive the platter media to rotate based on the platter media rotating at the normal rotational speed; and
recurringly resuming driving the platter media to rotate at the normal rotational speed and transmitting a signal coincident with resuming driving the platter media based on the platter media rotating at the lower threshold rotational speed.

13. The computer-implemented method of claim 8, comprising:
receiving a signal conveying a first command to transition to a power saving mode;
determine whether to place to the platter media in the low power state based on receiving the first command;
receiving a signal conveying a second command to transition to a fully powered mode; and
resuming driving the platter media to rotate at the normal rotational speed based on the second command.

14. The computer-implemented method of claim 8, comprising:
awaiting a selected period of time since receiving any signal conveying a command to either store or retrieve data;
determining whether to place the platter media in a low power state based on the selected period of time elapsing without receiving the command to either store or retrieve data;
receiving a signal conveying a command to either store or retrieve data when ceasing to rotate the platter;
determining whether to exit the low power state based on receiving the command to either store or retrieve data; and
resuming driving the platter media to rotate at the normal rotational speed based on the command.

15. The computer-implemented method of claim 8, comprising:
coupling coils of a motor mechanically coupled to the platter media to a power source to regeneratively brake rotation of the platter media and recharge the power source.

16. An apparatus comprising:

platter media to store data;

a motor mechanically coupled to the platter media to rotate the platter media; and a controller comprising logic to cause the controller to:
- await a selected period of time since receiving any signal conveying a command to either store or retrieve data;
- determining whether to place or keep the platter media in a low power state based on the period of time elapsing without receiving the command to either store or retrieve data;
- power down the motor to cease to drive the platter media to rotate based on the platter media rotating at a selected normal rotational speed and the determination to place the platter media in the low power state;
- recurringly power down the motor to cease to drive the platter media to rotate based on the platter media rotating at an upper threshold rotational speed and the determination to keep the platter media in the low power state, the upper threshold rotational speed less than the normal rotational speed;
- recurringly power up the motor to drive the platter media to rotate at the upper threshold rotational speed based on the platter media rotating at a lower threshold rotational speed, the lower threshold rotational speed less than the upper threshold rotational speed and non-zero; and
- power up the motor to drive the platter media to rotate at the normal rotational speed based the determination not to keep the platter media in the low power state.

17. The apparatus of claim 16, the controller caused to either store data on the platter media or retrieve data from the platter media when the platter media rotates at the normal rotational speed.

18. The apparatus of claim 16, the controller caused to:
- receive a signal conveying a first command to transition to a power saving mode;
- determining to place or keep the platter media in the low power state based on receiving the first command;
- receive a signal conveying a second command to transition to a fully powered mode; and
- determining not to keep the platter media in the low power state based on receiving the first command.

19. The apparatus of claim 16, the controller caused to:
- electrically couple coils of the motor to a power source to regeneratively brake rotation of the platter media and recharge the power source.

* * * * *

UNITED STATES PATENT AND TRADEMARK OFFICE
CERTIFICATE OF CORRECTION

PATENT NO.          : 8,982,488 B2                                            Page 1 of 1
APPLICATION NO.     : 13/729221
DATED               : March 17, 2015
INVENTOR(S)         : Kardach et al.

It is certified that error appears in the above-identified patent and that said Letters Patent is hereby corrected as shown below:

In the claims,

In column 25, line 4, in claim 1, delete "that" and insert -- than --, therefor.

In column 25, line 28, in claim 5, delete "place to" and insert -- place --, therefor.

In column 26, line 10, in claim 8, delete "that" and insert -- than --, therefor.

In column 26, line 39, in claim 13, delete "place to" and insert -- place --, therefor.

In column 28, line 5, in claim 16, delete "based" and insert -- based on --, therefor.

Signed and Sealed this
Nineteenth Day of January, 2016

Michelle K. Lee
*Director of the United States Patent and Trademark Office*